(12) United States Patent  
Boston et al.

(10) Patent No.: US 10,021,183 B2  
(45) Date of Patent: Jul. 10, 2018

(54) SYSTEM FOR TRACKING EXTERNAL DATA TRANSMISSIONS VIA INVENTORY AND REGISTRATION

(71) Applicant: BANK OF AMERICA CORPORATION, Charlotte, NC (US)

(72) Inventors: Mitchell T. Boston, Richardson, TX (US); Paul G. Roscoe, Chester (GB); Renee M. Melin, Waxhaw, NC (US); Manu Jacob Kurian, Dallas, TX (US); Saritha Vrittamani, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 271 days.

(21) Appl. No.: 15/149,705

(22) Filed: May 9, 2016

(65) Prior Publication Data

US 2017/0324811 A1 Nov. 9, 2017

(51) Int. Cl.
*H04L 29/08* (2006.01)
*G06F 17/30* (2006.01)

(52) U.S. Cl.
CPC .... *H04L 67/1095* (2013.01); *G06F 17/30067* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 2002/0026521 A1* | 2/2002 | Sharfman | H04L 29/06027 709/231 |
| 2002/0128946 A1* | 9/2002 | Chehade | G06Q 10/087 705/37 |
| 2004/0254868 A1* | 12/2004 | Kirkland | G06F 21/313 705/35 |
| 2006/0135121 A1* | 6/2006 | Abedi | G06F 21/51 455/410 |
| 2006/0161644 A1* | 7/2006 | Adelman | H04L 29/12066 709/222 |
| 2007/0093234 A1* | 4/2007 | Willis | G06F 21/6245 455/410 |

(Continued)

*Primary Examiner* — Backhean Tiv
(74) *Attorney, Agent, or Firm* — Michael A. Springs; Moore & Van Allen PLLC; James C. Edwards

(57) ABSTRACT

A platform for tracking external data transmissions through implementation of a data transmission inventory and registration process. The data transmission inventory provides for collection of data transmission logs and data transmission schedules from various sources throughout an enterprise. The information from the data transmission inventory is used to determine whether a pending, ongoing or completed data transmission is currently registered and, if so, whether the registration is currently valid. If a determination is made that no registration exits or the current registration is invalid, a validation/registration process ensues, whereby the data, the internal source and the external target are validated according to requisite requirements of the corresponding transmission. If validated, the data channel is deemed valid and is registered. If the data, internal source or external source are found to be invalid entries in the data transmission log or schedule are tagged/flagged indicating the invalidity and cause of the invalidity.

20 Claims, 4 Drawing Sheets

(56) References Cited

U.S. PATENT DOCUMENTS

| | | | | |
|---|---|---|---|---|
| 2007/0245409 A1* | 10/2007 | Harris | ............... | H04L 63/0272 726/5 |
| 2008/0084972 A1* | 4/2008 | Burke | ............... | G06Q 10/107 379/88.02 |
| 2008/0301703 A1* | 12/2008 | Nixon | ............... | G06F 8/38 719/312 |
| 2009/0106158 A1* | 4/2009 | Hill | ............... | G06Q 20/04 705/66 |
| 2009/0247122 A1* | 10/2009 | Fitzgerald | ............... | G06F 21/88 455/410 |
| 2010/0017597 A1* | 1/2010 | Chandwani | ............... | H04L 29/1232 713/156 |
| 2010/0131385 A1* | 5/2010 | Harrang | ............... | G06Q 30/00 705/26.1 |
| 2011/0314536 A1* | 12/2011 | Kuckelman | ............... | H04L 63/02 726/12 |
| 2014/0012949 A1* | 1/2014 | Meyers | ............... | H04L 67/1095 709/217 |
| 2016/0080397 A1* | 3/2016 | Bacastow | ............... | H04L 63/1408 726/1 |
| 2016/0148332 A1* | 5/2016 | Stibel | ............... | G06Q 20/4016 705/44 |
| 2016/0352518 A1* | 12/2016 | Ford | ............... | G06F 12/1408 |
| 2017/0177608 A1* | 6/2017 | Cismas | ............... | G06F 17/30165 |
| 2017/0214700 A1* | 7/2017 | Bacastow | ............... | H04L 63/1408 |
| 2017/0324811 A1* | 11/2017 | Boston | ............... | H04L 67/1095 |
| 2017/0352032 A1* | 12/2017 | Mohsenzadeh | ............... | G06Q 20/3821 |

* cited by examiner

SYSTEM FOR TRACKING EXTERNAL DATA TRANSMISSIONS VIA INVENTORY AND REGISTRATION

FIELD

In general, embodiments of the invention relate to managing the transmission of data and, more particularly, a system that tracks external data transmissions that have occurred or, in some embodiments are occurring or are about to occur, to insure the validity of the data, the internal source and the external entity through use of a comprehensive data transmission inventory and a data transmission registration process.

BACKGROUND

In large enterprises, it is imperative that confidential and/or proprietary data be properly protected against exposure, otherwise referred to as a data breach. In certain instances such data includes customer data, e.g., social security numbers, names, addresses, telephone numbers and the like, as well as customer account related data, such as account numbers, account balances, transaction entries and the like.

In the large enterprise environment, the enterprise needs to not only ensure that their confidential/proprietary data is properly and securely protected internally (i.e., within the physical and network confines of the enterprise), but also the enterprise must ensure, where the need arises to communicate/transmit the data to an external entity, that the confidential/proprietary data is properly transmitted to such external entities. In the large enterprise setting, external entities may include, but are not limited to, vendors (i.e., entities in a contractual relationship with the large entities) and other non-contracting third-party entities, for example, other large enterprises, customers or the like.

While, the large enterprise must ensure that the external entity has the proper mechanisms, procedures and governance in place to not only receive confidential/proprietary data, but also properly store such data to prevent exposure. Moreover, in instances where the external entity, is implementing the Internet or a mobile platform to host the confidential/proprietary data, the enterprise, must ensure that the proper mechanisms, procedures and governance are in place to securely host the confidential/proprietary data. In this regard, the enterprise must be able to manage the risk of using the confidential/proprietary data by an external entity (i.e., outside of the enterprise's firewall).

While some enterprises have made marginal strides in insuring the validity of data being transmitted and/or the compliance of both internal sources and external entities (otherwise referred to as external targets), such validation systems typically rely on pre-transmission awareness of the transmission in order for the validation to occur. However, in many instances throughout a large enterprise, due to system unawareness or negligence, a user may transmit data without validating the data, the source and/or the target. In such instances, enterprises have the need to be made of aware that such transmissions are occurring in order to prevent future non-validated data transmissions from occurring and to meet internal and/or external auditing procedures and/or reporting compliance.

Therefore, a need exists to develop systems, apparatus, computer program products, methods and the like that provide a reliable and effective means for ensuring the protection, security and confidentiality of data that is electronically transmitted to external entities. The desired systems, apparatus, computer program products, methods and the like should register previous transmissions (and, in some embodiments, register pending transmissions) that have been validated for data, internal source and external target. Additionally, the desired systems, apparatus, computer program products, methods and the like should provide for tagging/flagging previous data transmissions that are have been determined to include invalid data, invalid internal source and/or invalid external target and notifying/alerting designated entities to correct the invalid data, invalid internal source and/or invalid external target and/or prevent future similar data transmissions.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for tracking and monitoring external data transmissions through implementation of a data transmission inventory and data transmission registrar. External data transmissions are communications of data, typically large files or the like, to third party entities, such as vendors, customers or the like. The data is typically secure or proprietary data and, therefore the internal entity, such as a large enterprise or the like, has an interest in assuring that the data is communicated securely and accurately and that the internal source of the data (i.e., where the data comes from) and the external target (i.e., where the data is going to) are verified and provide requisite security features.

Embodiments of the present invention create an inventory of data transmissions by importing data transmission logs, data transmission schedules and other relevant data from various sources throughout an enterprise. Data transmission logs may indicate external data transmissions that have previous been completed or, in some embodiments, transmission logs may indicate external data transmissions that are currently ongoing. Data transmission schedules may indicate planned/scheduled external data transmissions.

In additional embodiments of the present invention rely on a data transmission registrar which registers external data transmissions. A "registered" external data transmission indicates that (i) the data, (ii) the internal source and (iii) the external target has been verified or validated to meet requisite requirements of the data transmission. In certain instances, users may manually enter a data transmission registration request prior to the occurrence data transmission (e.g., a one-time-only data transmission or the next/first data transmission in an ongoing series of data transmissions) and the data transmission may be verified and registered prior to the data transmission.

In other instances, in which the user/data transmission requester fails to pre-register the data transmission prior to transmission, embodiments of the invention provide for, accessing/importing the data transmissions logs/schedules and determining whether the data transmissions (i.e., pending, ongoing or completed) have previously been registered and, if so, whether the registration is still valid (i.e., whether the data transmission involves/involved the registered data, internal source and external target or whether the data transmission involves/involved different data, a different internal source and/or a different external target (i.e., invalid registration)). In the event that the either the data transmission has not been registered or the registration is invalid, the present invention will proceed with an automated validation/registration process, whereby the data, the internal source, and the external target are validated. In response to validating the data transmission, the data transmission is deemed registered and a registration identifier (e.g., number or the like) is generated and the registered data transmission is stored in the data transmission registrar.

In further embodiments of the invention, in the event that one or more of the data, the internal source and/or external target are determined to be invalid, the data transmission entry in the data transmission logs may be tagged/flagged to indicate the invalid state. Moreover, embodiments of the invention may provide for, in response to determining that at least one of the data, the internal source and/or external target are invalid, generating and communicating alert(s) to designated entities within the enterprise that notify the parties of the invalid data transmission and the reason for invalidity. In the event that the data transmission is pending or currently ongoing (as opposed to a completed data transmission), embodiments of the invention may further provide for cancelling and/or suspending the data transmission. Additionally, in the event that the data transmission is scheduled, embodiments of the present invention may further provide for postponing and/or cancelling the data transmission. In addition, tagged/flagged entries in the data transmission logs and/or data transmission schedules may be communicated to investigation entities within the enterprise to provide forensic analysis as to the cause of the invalidity.

A system for tracking external data transmissions within an enterprise defines first embodiments of the invention. The system includes a data transmission registrar that is configured to receive, in computing device storage, a plurality of data transmission registrations. Each registration includes an associated registration identifier (e.g., number) and indicates validation of (i) data to be transmitted, (ii) an internal source from which the data is sent, and (iii) an external target to which the data is sent. The system additionally includes a data transmission inventory that is configured to receive, in computing device storage, one or more of (i) data transmission logs and (ii) data transmission schedules from a plurality of data transmission sources. The data transmission logs and data transmission schedules identify pending, ongoing and/or completed external data transmissions and include, for each data transmission, identification of data transmitted, an internal source and an external target.

The system additionally includes a computing platform including a memory and at least one processor in communication with the memory. In addition, the system includes a data transmission tracking module that is stored in the memory and executable by the processor. The module is configured to access the data transmission inventory to retrieve at least one of one or more data transmission logs or one or more data transmission schedules and determine, for each of the external data transmissions in the one or data transmissions logs or one or more data transmission schedules, whether the external data transmission is a registered data transmission and determine, for each registered data transmission, whether the registered data transmission is a valid registered data transmission. In response to determining that the external data transmission is not (a) a registered data transmission or (b) a valid registered data transmission, the module is further configured to validate (i) data in the transmission, (ii) an internal source from which the data is transmitted, and (iii) an external target to which the data is transmitted. Additionally, the module is further configured to, in response to validating the data, the internal source, and the external target, generating a corresponding data transmission registration including an associated registration identifier and storing the data transmission registration in the data transmission registrar.

In further specific embodiments of the system, the data transmission tracking module is further configured to, in response to failing to validate at least one of (i) the data in the transmission, (ii) the internal source, or (iii) the external target, tag/flag the corresponding data transmission entry in the log or schedule to indicate at least one of invalid data, invalid source or invalid target. In such embodiments of the system, the data transmission tracking module is further configured to generate and communicate an alert that notifies one or more designated entities within the enterprise of the failure to validate at least one of (i) the data in the transmission, (ii) the internal source, or (iii) the external target.

In other specific embodiments of the system, the data transmission tracking module is further configured to, in response to determining that the data transmission is not a registered data transmission or a valid registered data transmission, generate and communicate an alert that notifies one or more designated entities within the enterprise that the data transmission is not registered or is not validly registered.

In additional specific embodiments of the system, the data transmission tracking module is further configured to validate the data in the transmission by at least one of verifying that the data has not been previously sent to the target, verifying that the data has not been previously received from the source, verifying that the data does not exceed a predetermined data size threshold and verifying that the data meets predetermined classification rules. Additionally, the data transmission tracking module is further configured to validate the internal source by at least one of verifying that the internal source has current and required security features, verifying that the internal source is approved for data transmissions, and verifying that the internal source is not Internet-facing. In addition, the data transmission tracking module is further configured to validate the external target by at least one of verifying that an Internet Protocol (IP) address associated with the external target is approved for receiving data transmissions, verifying that a recipient or application associated with the IP address is approved for receiving data transmissions and verifying that the recipient or application is an approved recipient or application based on the data-type.

In still further specific embodiments of the system, the data transmission logs indicate external data transmissions including at least one of previously completed external data transmissions and currently ongoing external data transmissions. In such embodiments of the system, the data transmission tracking module is further configured to, in response to determining that the external data transmission is not (a) a registered data transmission or (b) a valid registered data transmission, suspend transmission of a currently ongoing data transmission until the data transmission is validated. In still further related embodiments of the system, the data transmission tracking module is further configured to, in response to determining that the external data transmission is not valid, cancel transmission of a currently ongoing data transmission and generate and communicate an alert that notifies one or more designated entities within the enterprise of invalid data transmission and the cancellation of the transmission.

Moreover, in further specific embodiments the systems includes a data transmission permission module stored in the memory, executable by at least one processor and configured to verify that a data transmission is a registered data transmission prior to permitting the transmission of data. In such embodiments of the system, the data transmission tracking module may be further configured to verify that the data transmission has been permitted for data transmission by the data transmission permission module.

A method for tracking external data transmissions in an enterprise defines second embodiments of the invention. The method includes accessing, by a computing device processor, a data transmission inventory to retrieve at least one of one or more data transmission logs or one or more data transmission schedules stored in the inventory. The data transmission logs and data transmission schedules identify a plurality of external data transmission and include, for each data transmission, identification of data, an internal source and an external data transmission. The method further includes determining, by a computing device processors, for each of the external data transmissions in the one or data transmissions logs or the data transmission schedules, whether the external data transmission is a registered data transmission and, for each registered data transmission, whether the registered data transmission is a valid registered data transmission. In addition, the method includes, in response to determining that the external data transmission is not (a) a registered data transmission or (b) a valid registered data transmission, validating, by a computing device processor, (i) data in the transmission, (ii) an internal source from which said data is transmitted, and (iii) an external target to which said data is transmitted. Additionally, the method includes, in response to validating the (i) data in the data transmission, (ii) internal source, and (iii) external target, generating, by a computing device processor, a corresponding data transmission registration including an associated registration identifier and storing said data transmission registration in a data transmission registrar. The data transmission registrar stores a plurality of data transmission registrations, wherein each registration includes an associated registration identifier and indicates validation of (i) data to be transmitted, (ii) an internal source from which said data is sent, and (iii) an external target to which said data is sent.

An apparatus for tracking external data transmissions defines third embodiments of the invention. The apparatus includes a computing platform including a memory and at least one processor in communication with the memory. The apparatus further includes a data transmission tracking module that is stored in the memory and executable by the processor. The module is configured to access a data transmission inventory to retrieve at least one of (i) one or more data transmission logs or (ii) one or more data transmission schedules stored in the inventory. The data transmission logs and data transmission schedules identify a plurality of external data transmission and include, for each data transmission, identification of data, an internal source and an external data transmission. The module is further configured to determine, for each of the external data transmissions in the one or data transmissions logs or data transmission schedules, whether the external data transmission is a registered data transmission and, for each registered data transmission, whether the registered data transmission is a valid registered data transmission. Additionally, the module is configured to, in response to determining that the external data transmission is not (a) a registered data transmission or (b) a valid registered data transmission, validate (i) data in the transmission, (ii) an internal source from which the data is transmitted, and (iii) an external target to which the data is transmitted, and, in response to validating, generate a corresponding data transmission registration including an associated registration identifier and store said data transmission registration in a data transmission registrar. The data transmission registrar stores a plurality of data transmission registrations, wherein each registration includes an associated registration identifier and indicates validation of (i) data to be transmitted, (ii) an internal source from which said data is sent, and (iii) an external target to which said data is sent.

Thus, systems, apparatus, methods, and computer program products herein described in detail below provide for tracking external data transmissions through implementation of a data transmission inventory and registration process. The data transmission inventory provides for collection of data transmission logs and, in some embodiments, data transmission schedules from various sources throughout an enterprise. The information from data transmission inventory is used to determine whether a pending, ongoing or completed data transmission is currently registered and, if so, whether the registration is currently valid. If a determination is made that no registration exits or the current registration is invalid, a validation/registration process ensues, whereby the data, the internal source and the external target are validated according to requisite requirements of the corresponding transmission. If the data, the internal source and the external source are all validated, the data channel is deemed valid and is registered. If any one of the data, internal source or external source is found to be invalid entries in the data transmission log or schedule are tagged/flagged indicating the invalidity and cause of the invalidity. Other actions may ensue, some as alerting/notifying designated parties of the invalidity and or investigative analysis.

BRIEF DESCRIPTION OF THE DRAWINGS

Figure 1:
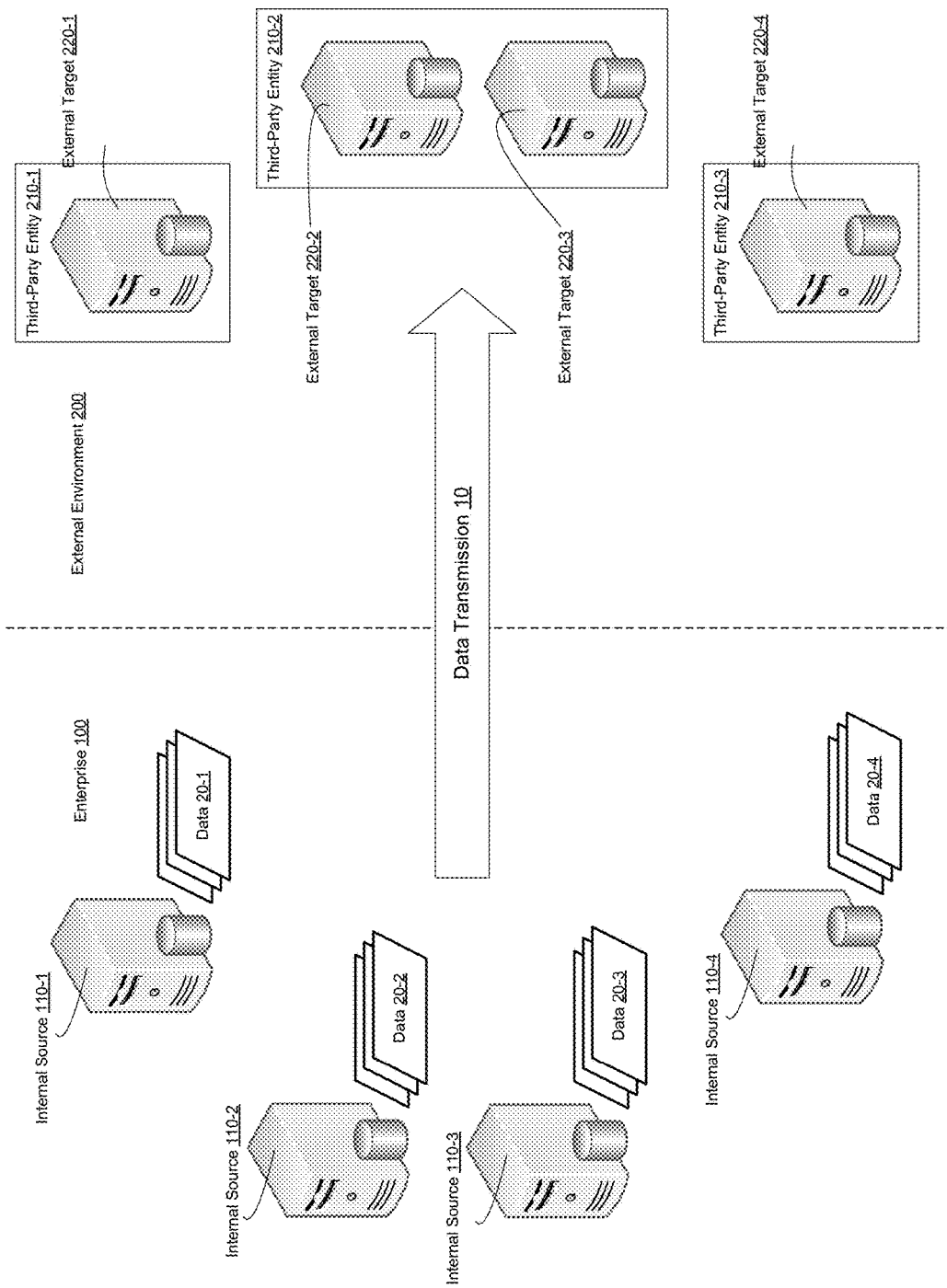
Figure 2:
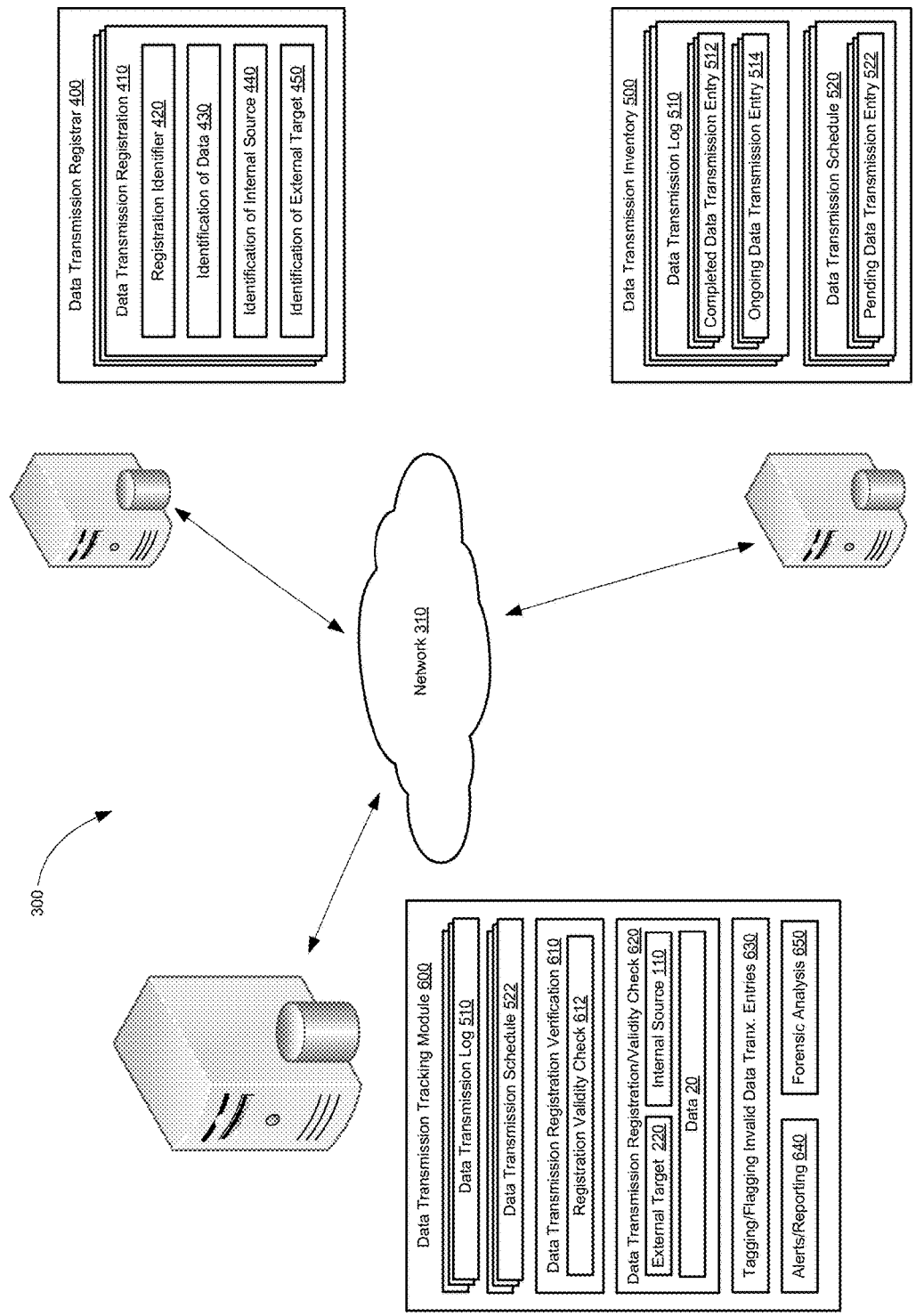
Figure 3:
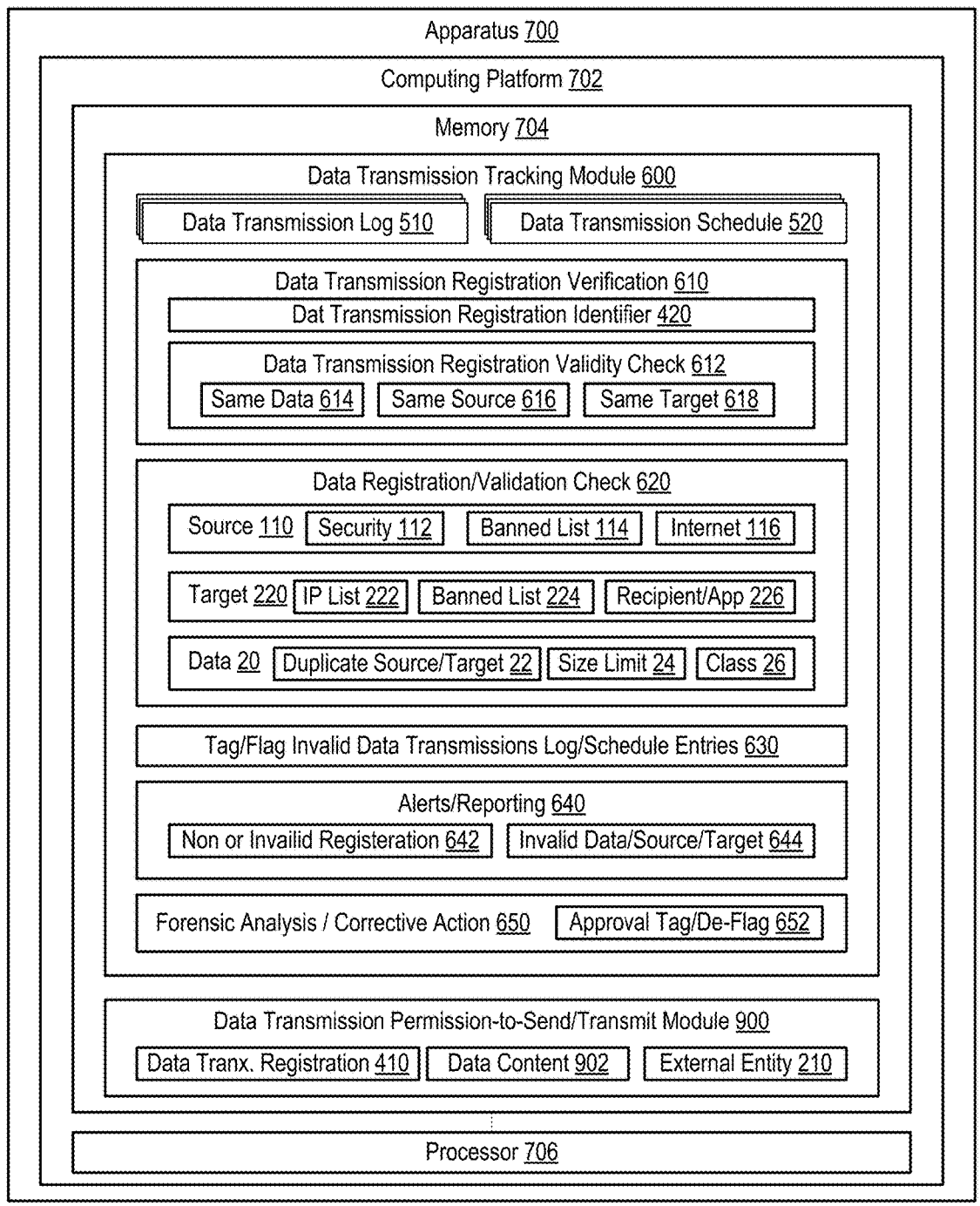
Figure 4:
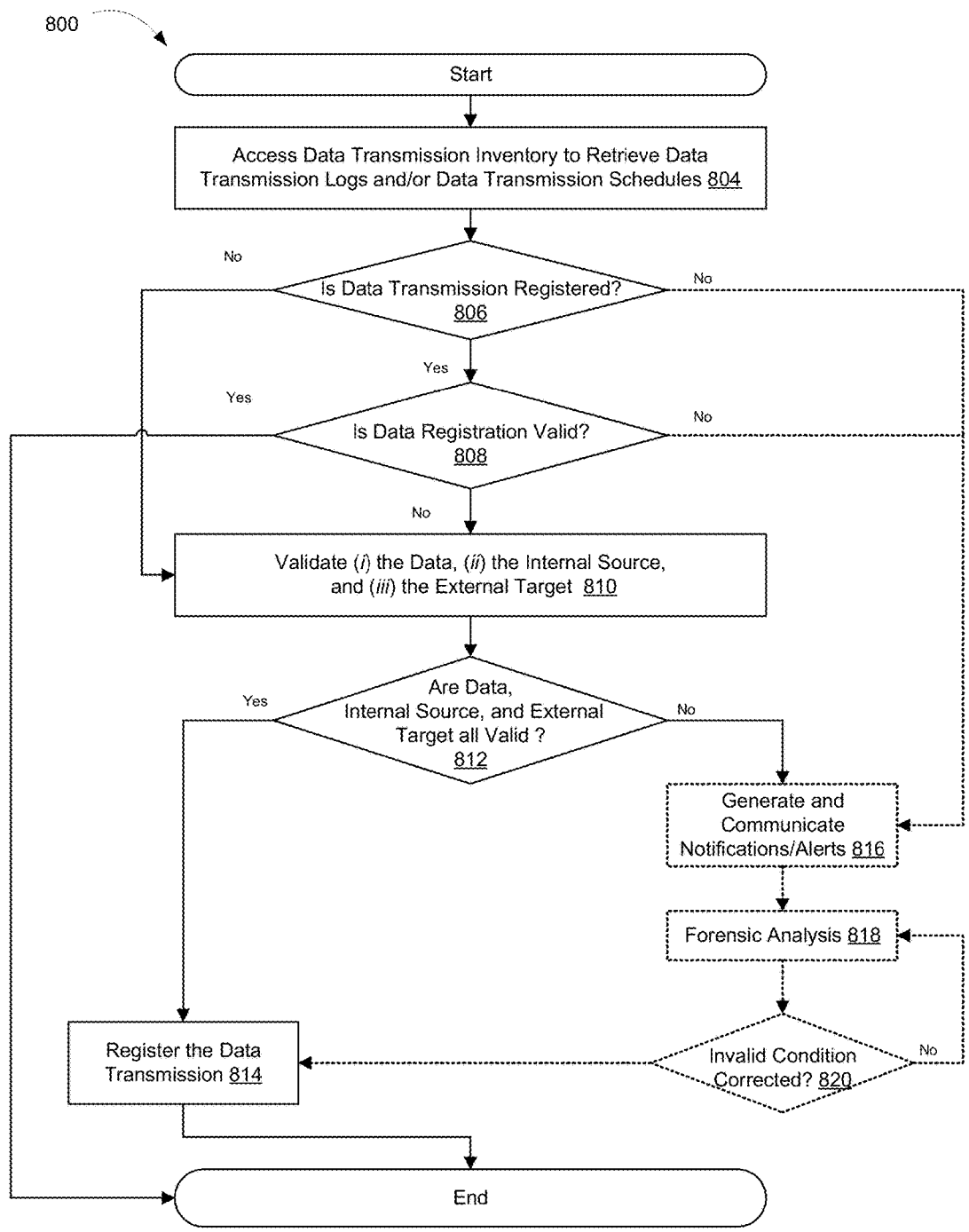

Having thus described embodiments of the invention in general terms, reference will now be made to the accompanying drawings, which are not necessarily drawn to scale, and wherein:

FIG. 1 provides schematic diagram of external data transmissions in an enterprise, in accordance with embodiments of the present invention;

FIG. 2 provides a schematic diagram of a system for tracking external data transmissions, in accordance with embodiments of the present invention;

FIG. 3 provides a block diagram of an apparatus configured for tracking external data transmissions, in accordance with embodiments of the present invention; and FIG. 4 provides a flow diagram of a method for tracking external data transmissions, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for tracking and monitoring external data transmissions through implementation of a data transmission inventory and data transmission registrar. External data transmissions are communications of data, typically large files or the like, to third party entities, such as vendors, customers or the like. The data is typically secure or proprietary data and, therefore the internal entity, such as a large enterprise or the like, has an interest in assuring that the data is communicated securely and accurately and that the internal source of the data (i.e., where the data comes from) and the external target (i.e., where the data is going to) are verified and provide requisite security features.

FIG. 1 provides a schematic diagram of enterprise 100 and external environment 200, in accordance with embodiments of the present invention. The enterprise 100 will include a plurality of internal data sources 110, such as 110-1, 110-2, 110-3, 110-4 and the like. The internal data sources, which may comprise database servers or the like, may be physically located at various locations throughout the enterprise and are logically connected via an network, such as an intranet or the like (not shown in FIG. 1). The internal data sources 110, which are identifiable through an Internet Protocol (IP) address or the like, are configured to generate and/or store data 20, such as 20-1, 20-2, 20-3, 20-4 and the like that requires transmission/communication to external/third-party entities 210, such as 210-1, 210-2, 210-3 and the like. As previously noted, the data 20 may include confidential and/or proprietary data and, therefore, the need exists to control the transmission/communication of the data 20 to insure that proper security measures are implemented throughout the transmission/communication process. The external/third-entities may be any entity that has a need for the data 20, such as vendors, subsidiaries, customers/clients and the like.

The external entities 210 house targets, herein referred to as external targets 220, such as 220-1, 220-2, 220-3, 220-4 and the like. The external targets 220, which may comprise database servers or the like, may be physically located at various locations throughout the third-party entities 210-1, 210-2, 210-3 and the like. The external targets 220, which are identifiable through an Internet Protocol (IP) address or the like, are configured to receive and/or store data 20, such as 20-1, 20-2, 20-3, 20-4 and the like once the data 20 has been transmitted/communicated. Data transmission 10 may occur by any known or future known data transmission means, using any known or future known data transmission protocol. The data transmission 10 may implement a public network, such as the Internet or private networks. When implementing a public network, data transmission 10 may provide for tunneling. Otherwise referred to as "port forwarding" to ensure the secure nature of the transmission. Tunneling is generally done by encapsulating the data and protocol information within the public network transmission units so that the private network protocol information appears to the public network as data; thus, allowing use of the public network to convey data on behalf of a private network.

Referring to FIG. 2, a schematic diagram is presented of a system 300 for tracking data transmissions, in accordance with embodiments of the present invention. The system is logically connected through a network 310, which may comprise an intranet or the like. The system 300 generates and relies on a data transmission registrar 400 which registers external data transmissions. "Registering" a data transmission provides for validating (i) the data 20, (ii) the internal source 110, and (iii) the external target 220 (as shown in FIG. 1 and described above) in accordance with the rules prescribed by the enterprise. It should be noted that registration/validation rules will vary from enterprise-to-enterprise and may be dictated by the type of data 20 that is being transmitted (i.e., the level of confidential/proprietary information included in the data or level of security required).

A data transmission registration includes a registration identifier 410, typically a numeric identifier that can be implemented across the enterprise as a means for providing network and infrastructure approvals for transmitting the data. The data transmission registration 410 additionally provides for identification of the data 430, identification of the internal source 440 and identification of the external target 450 associated with the data transmission. Identification of the data 430 may include, but is not necessarily limited to, a file name or the like. Identification of the internal source 440 and/or external target 450 may include, but is not necessarily limited to, an IP address or the like.

In certain instances, users may manually enter a data transmission registration request prior to the occurrence data transmission (e.g., a one-time-only data transmission or the next/first data transmission in an ongoing series of data transmissions) and the data transmission may be valid and a data transmission registration 410 prior to the data transmission. In other instances, in which the user fails to pre-register the transmission, registration occurs, in an automated fashion, according the embodiments of the invention herein described below for completed and, in some embodiments ongoing or pending, data transmissions.

In addition, system 300 includes data transmission inventory 500 which is configured to store a plurality of data transmission logs 510 and/or data transmission schedules 520. Data transmission logs 510 include completed data transmission entries 512, as well as, in some embodiments of the system, currently ongoing data transmission entries 514 (i.e., data transmissions that are in-progress but have yet to be completed). Data transmission schedules 520 include pending data transmission entries 522, which indicate planned/scheduled external data transmissions.

System 300 additionally includes data transmission tracking module 600 that is configured to import the data transmission logs 510 from the data transmission inventory 500 and, in some embodiments of the invention, additionally import the data transmission schedules 520. The module 600 is configured to analyze the entries 512, and/or 514 in the data transmission log 510 and/or the entries 522 in the data transmission schedules 520. Such analysis includes data transmission registration verification 610 to determine if the data transmission associated with the entry is a registered data transmission. Typically, such a verification will include verifying that the entry 512, and/or 514 in the data transmission log 510 and/or the entry 522 in the data transmission schedules 520 includes a registration identifier 420. In the event that the data transmission associated with an entry is confirmed to be a registered data transmission, analysis further includes performing a data transmission registration validity check 612, in which a determination is made as to whether the registration is currently valid. For example, a user or the system may have registered a data transmission for transmitting data "A" from internal source "B" to external target "C". However, if the entry 512, 514 or 522 indicates that data transmission of data "A" from internal source "D" to external target "C", or data "E" form internal source "B" to external source "C" or the like (i.e., at least one of the components (i.e., data, internal source and external target) is not the same as the components in the data transmission registration 410), then the registration 410 for the data transmission associated with the entry 512, 514 or 522 is deemed to be invalid.

In the event that the data transmission associated with an entry 512, 514 or 522 is determined to either be (i) not currently registered or (ii) the current registration is invalid, the module is further configured to perform a data transmission registration/validity check 620. The validity check 620 validates the data 20, the internal source 110 and the external target 220. In response to validating the data 20, the internal source 110 and the external target 220, the data transmission may be deemed registered and a registration identifier 420 is generated. The registration identifier 420 may be added to the entry 512, 514 or 522 and the data transmission registration 410 is added to the data transmission registrar 400.

In the event that at least one of the data, the internal source and/or the external target is determined to be invalid, the entry 512, 514 or 522 is tagged/flagged 630 to indicate the issue that resulted in the invalidity. Moreover, in response to determining that at least one of the data, the internal source and/or the external target is invalid, one or more alerts, notifications and/or reports 640 may be generated and communicated to one or more designated entities in the enterprise, such that alert/notification and/or report notify the designated entities of the specifics surrounding the invalidity determination. In addition, forensic analysis 650 may be performed on the data transmission to determine the cause of the invalidity and provide requisite corrective actions.

Referring to FIG. 3 a block diagram is presented of the apparatus 700, which is configured for tracking external data transmissions, in accordance with embodiments of the present invention. In addition to providing greater detail, FIG. 3 highlights various alternate embodiments of the invention. The apparatus 700 may include one or more of any type of computing device, such as servers and the like. The present apparatus and methods can accordingly be performed on any form of one or more computing devices.

The apparatus 700 includes computing platform 702 that can receive and execute algorithms, such as routines, and applications. Computing platform 702 includes memory 704, which may comprise volatile and non-volatile memory, such as read-only and/or random-access memory (RAM and ROM), EPROM, EEPROM, flash cards, or any memory common to computer platforms. Further, memory 704 may include one or more flash memory cells, or may be any secondary or tertiary storage device, such as magnetic media, optical media, tape, or soft or hard disk.

Further, computing platform 702 also includes processor 706, which may be an application-specific integrated circuit ("ASIC"), or other chipset, processor, logic circuit, or other data processing device. Processor 706 or other processor such as ASIC may execute an application programming interface ("API") (not shown in FIG. 3) that interfaces with any resident programs, such as data transmission tracking module 600 and routines, sub-modules associated therewith or the like stored in the memory 704 of the apparatus 700.

Processor 706 includes various processing subsystems (not shown in FIG. 3) embodied in hardware, firmware, software, and combinations thereof, that enable the functionality of apparatus 700 and the operability of the apparatus 700 on a network. For example, processing subsystems allow for initiating and maintaining communications and exchanging data with other networked devices. For the disclosed aspects, processing subsystems of processor 706 may include any subsystem used in conjunction with data transmission tracking module 600, data transmission permission-to-send/transmit module 900 and related algorithms, sub-algorithms, sub-modules thereof.

Computer platform 702 may additionally include communications module (not shown in FIG. 3) embodied in hardware, firmware, software, and combinations thereof, that enables communications among the various components of the apparatus 700, as well as between the other networked devices. Thus, communication module may include the requisite hardware, firmware, software and/or combinations thereof for establishing and maintaining a network communication connection.

As previously discussed in relation to FIG. 2, the memory 704 of apparatus 700 stores data transmission tracking module 600 that is configured to monitor, track and register external data transmissions throughout an enterprise, in accordance with embodiments of the present invention. In this regard, module 600 is configured to import the data transmission logs 510 from the data transmission inventory 500 and, in some embodiments of the invention, additionally import the data transmission schedules 520. It should be noted that in specific embodiments of the invention, the module 600 is configured to only import data transmission logs 510, which include completed data transmissions 512 and, in some embodiments, currently in-progress/ongoing data transmissions 514. In those embodiments in which the data transmissions logs 510 include in-progress/ongoing data transmissions 514. The present invention may be able to analyze such transmissions, in real-time or near real-time, and interrupt/cancel ongoing transmissions if the data 20, internal source 110 or external target 220 are determined to be invalid. In other embodiments of the invention, the module 600 may be configured to, separately or in unison with data transmission logs 510, import data transmissions schedules 520.

In response to receiving one or more data transmission logs 510 and/or one or more data transmission schedules 520, the module 600 is configured to analyze the entries in the data transmission log 510 and/or the entries in the data transmission schedules 520. Such analysis includes data transmission registration verification 610 to determine if the data transmission associated with the entry is a registered data transmission. Typically, such a verification will include verifying that the entry 512, and/or 514 in the data transmission log 510 and/or the entry 522 in the data transmission schedules 520 includes a registration identifier 420. In response to determining that the data transmission associated with an entry is a registered data transmission, analysis further includes performing a data transmission registration validity check 612, in which a determination is made as to whether the registration is currently valid (i.e., whether the same data 614, the same internal source 616 and the same target 618 are in both the data transmission associated with the entry and the data transmission registration 410). In certain instances, the registration may have occurred in the distant past, in which case, the data, the internal source or the external terminal source may have changed over time. In other instances, a user may have registered certain data, an internal source and/or an external target in error or the data, internal source, and/or external source used for the actual data transmission may be in error.

As such, module 600 is further configured, in response to determining that the data transmission associated with an entry 512, 514 or 522 is determined to either be (i) not currently registered or (ii) the current registration is invalid, the module is further configured to perform a data transmission registration/validity check 620. The validity check 620 validates the data 20, the internal source 110 and the external target 220. The validity checks 620 may be fully automated validity checks and/or may include semi-automated checks that require or are otherwise aided by user intervention. Specifically, the data 20 validation checks may include, but are not limited to, checks for duplicate/same data 22 transmitted to the external entity/external target or repeated/same data from the internal source. Further, the data 20 validity checks may include checks for data size in comparison to predetermined data size thresholds/limits. Moreover, the data 20 validity checks may include data classification 26 checks/reviews to insure proper type/classification of data is being transmitted.

The internal source 110 validation checks may include security 112 validation checks to make sure that the source has requisite and update security features. Additionally, the internal source 110 validation checks may include verifying that the source is not on a banned list 114, which may be data-type specific or applicable to all data transmissions. In addition, the internal source 110 validation checks may include, but are not limited to, checking that the source is not Internet-facing 116 (i.e., a source with a port directly connected to an Internet modem or network interface unit).

The external source 220 validation checks may include, but are not limited to, verifying that the IP address or target profile is not on a compromised IP list 222 or banned list 224 or is otherwise associated with known malicious activities (e.g., IP address tied to a region/country associated with malicious activities). In addition, the external source 220 validation checks may include checking that the IP address is associated with a recipient 226 that is not associated with the enterprise (i.e., not a client, vendor, customer of the enterprise) and/or the IP address is associated with an invalid application 226 or the like.

As previously discussed in relation to FIG. 2, in response to validating the data 20, the internal source 110 and the external target 220, the data transmission may be deemed registered, a registration identifier 420 is generated and added to the entry 512, 514 or 522 in the data transmission log 510 or the data transmission 520 schedule, and the data transmission registration 410 is added to the data transmission registrar 400.

In response to determining that at least one of the data 20, the internal source 110 and/or the external target 220 is determined to be invalid (i.e., the data, internal source and/or external target does not meet one of the previous discussed validation checks or any other validation check deemed necessary based on the type of data and the requirements surrounding the data), the entry 512, 514 or 522 in the transmission log 510 and/or data transmission schedule 520 is tagged/flagged 630 to indicate invalid state of the associated data transmission.

In addition, as previously noted, the module 640 is configured to generate and initiate communication of alerts, notifications, reports or the like. Such alerts, notifications and reports include, but are not limited to, alerts/notifications for non-registration of a data transmission or an invalid data transmission registration 642, and a determination of invalid data, internal source and/or external target 644. The alerts are communicated to designated entities within the enterprise based on the nature of the alert.

Additionally, module 600 is configured to provide requisite forensic analysis and/or corrective action 650 to determine the cause of the invalid data, internal source and/or external target and to correct the invalidity either through performing actions at the invalid source and/or target or identifying and implementing a source and/or target that meets the requisite requirements for the data transmission. In response to correcting the invalid condition, the module 600 may be configured to provide an approval flag and/or remove the invalid tag/flag 652 from the entry in the data transmission log and/or data transmission schedule.

Further, the memory 704 of apparatus 700 stores data transmission permission-to-send/transmit module 900 that is configured to act as a gateway for external data transmission. For a detailed description of such a module, see U.S. patent application Ser. No. 14/588,430, entitled "System for Authorizing Electronic Communication of Confidential or Proprietary Data to External Entities", filed on Jan. 1, 2015 and assigned to the same inventive entity as the present application. U.S. patent application Ser. No. 14/588,430 is herein incorporated by reference as if set forth fully herein. In specific embodiments of the invention, module 900 is configured to authorize (i.e., permit to send) external data transmissions based on the data transmission registration 410. In such embodiments of the invention, the module 900 may further perform additional validity/verification checks prior to authorizing data transmissions, such as, but not limited to, data content 902 analysis to insure that the content of the data is what it purports to be, the content has not been modified the content does not contain unnecessary confidential/proprietary information and the like. In addition, the module 900 may perform further external entity 210 analysis to insure that the external entity has proper procedures and security measures in place.

Referring to FIG. 4 a flow diagram is depicted of a method for tracking external data transmissions, in accordance with embodiments of the present invention. At Event 802, a data transmission inventory is accessed to retrieve data transmission logs and, in some embodiments data transmission schedules. In specific embodiments of the invention, data transmission tracking is reactive, in that, the tracking is limited to performing analysis on completed data transmissions. In other embodiments of the invention, in which, the data transmission logs include entries for currently in-progress data transmissions and the logs are retrieved in real-time or near real-time, the tracking may include performing analysis on in-progress data transmission. Further, in other embodiments of the invention in which data transmission schedules are retrieved, the data tracking may be pro-active, in that, the tracking includes performing analysis on scheduled data transmissions.

At Decision 806, a determination is made as to whether a data transmission is registered. Such a determination is made by analyzing the data transmission log or schedule to determine if the corresponding entry has a registration identifier. If the determination is made that the data transmission is registered, at Decision 808, a determination is made as to whether the registration is valid. Such a determination is made by comparing the data, the internal source and the external source in the associated entry in the log/schedule to the information if the data transmission registration and, if the data, internal source and external target are all determined to be the same, the data transmission registration is deemed to be valid.

In response to determining that either (i) the data transmission is not registered (Decision 806), or (ii) the data registration is invalid (Decision 808), at Event 810, the data, the internal source and the external target associated with the data transmission undergo validation analysis. As previous discussed the validation analysis that is performed is specific to the requirements of the enterprise and/or units/division within the enterprise. In addition the specifics of the validation analysis may be dictated by the type of data that is being transmitted (i.e., more proprietary and/or confidential data may require heightened validation analysis of the data, the source and/or the target). In optional embodiments of the method, in response to determining that either (i) the data transmission is not registered (Decision 806), or (ii) the data registration is invalid (Decision 808), At Event 816 alerts/notifications may be generated and communicated to notify designated entities within the enterprise of the lack of registration or the invalid registration.

At Decision 812, a determination is made as to whether the data, the internal source and the external target have been determined to be valid. In response to a determination that the data, the internal source and the external target have been determined to be valid, at Event 814, the data transmission is registered. Registration provides for generating a registration identifier, including the registration in the data transmission registrar and, in some embodiments including the registration identifier in the associated entry in the data transmission log or data transmission schedule.

In response to determining that at least one of the data, the internal source and/or the external target is invalid, at optional Event 816, one or more alerts, notifications and/or reports may be generated and communicated to one or more designated entities within the enterprise that notify the entity of the invalid condition. In specific embodiments in which the invalid condition suspends an ongoing/in-progress data transmission or postpones/cancels a pending data transmission, the alert/notification may provide for notifying the entity of the suspension/cancellation/postponement. At further optional Event 818 forensic analysis is performed to determine the cause of the invalid condition and, in certain instances, perform corrective action to rectify the invalid condition. The corrective action may be instituting a change to the data or at the internal source and/or external target, or, alternatively, the corrective action may be to replace the data, internal source and/or external target with data, a source and/or a target that meets the requirements of the specific data transmission. At Decision 820, a determination is made as to whether the corrective action(s) has corrected the invalid condition. If the invalid condition(s) has yet to be corrected the method returns to Event 818 for further forensic analysis/corrective action. If the invalid condition(s) has been determined to be corrected, at Event 814, the data transmission is registered.

Thus, systems, apparatus, methods, and computer program products described above provide for tracking external data transmissions through implementation of a data transmission inventory and registration process. The data transmission inventory provides for collection of data transmission logs and data transmission schedules from various sources throughout an enterprise. The information from the data transmission inventory is used to determine whether a pending, ongoing or completed data transmission is currently registered and, if so, whether the registration is currently valid. If a determination is made that no registration exits or the current registration is invalid, a validation/registration process ensues, whereby the data, the internal source and the external target are validated according to requisite requirements of the corresponding transmission. If validated, the data channel is deemed valid and is registered. If the data, internal source or external source are found to be invalid entries in the data transmission log or schedule are tagged/flagged indicating the invalidity and cause of the invalidity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for tracking external data transmissions within an enterprise, the system comprising:
    a data transmission registrar configured to receive, in computing device storage, a plurality of data transmission registrations, wherein each registration includes an associated registration number and indicates validation of (i) data to be transmitted, (ii) an internal source from which said data is sent, and (iii) an external target to which said data is sent, wherein validation is defined by meeting predetermined external data transmission requirements;
    a data transmission inventory configured to receive, in computing device storage, one or more of data transmission logs and data transmission schedules from a plurality of data transmission sources, wherein the data transmission logs and data transmission schedules identify external data transmissions and include, for each data transmission, identification of data transmitted, an internal source and an external target;
    a computing platform including a memory and at least one processor in communication with the memory; and
    a data transmission tracking module stored in the memory, executable by the processor and configured to:
        access the data transmission inventory to retrieve at least one of one or more data transmission logs or one or more data transmission schedules,
        determine, for each of the external data transmissions in the one or data transmissions logs or one or more data transmission schedules, whether the external data transmission is a registered data transmission,
        determine, for each registered data transmission, whether the registered data transmission is a valid registered data transmission,
        in response to determining that the external data transmission is not (a) a registered data transmission or (b) a valid registered data transmission, validate (i) data in the transmission, (ii) an internal source from which said data is transmitted, and (iii) an external target to which said data is transmitted, and
        in response to validating (i) the data in the transmission, (ii) the internal source, and (iii) the external target, generating a corresponding data transmission registration including an associated registration number and storing said data transmission registration in the data transmission registrar.

2. The system of claim 1, wherein the data transmission tracking module is further configured to, in response to failing to validate at least one of (i) the data in the transmission, (ii) the internal source, or (iii) the external target, tag the data transmission to indicate at least one of invalid data, invalid source or invalid target.

3. The system of claim 2, wherein the data transmission tracking module is further configured to generate and communicate an alert that notifies one or more designated entities within the enterprise of the failure to validate at least one of (i) the data in the transmission, (ii) the internal source, or (iii) the external target.

4. The system of claim 1, wherein the data transmission tracking module is further configured to, in response to determining that the data transmission is not a registered data transmission or a valid registered data transmission, generate and communicate an alert that notifies one or more designated entities within the enterprise that the data transmission is not registered or is not validly registered.

5. The system of claim 1, wherein the data transmission tracking module is further configured to validate the data in the transmission, wherein validating the data includes at least one of verifying that the data has not been previously sent to the target, verifying that the data has not been previously received from the source, verifying that the data does not exceed a predetermined data size threshold and verifying that the data meets predetermined classification rules.

6. The system of claim 1, wherein the data transmission tracking module is further configured to validate the internal source, wherein validating the internal source includes at least one of verifying that the internal source has current and required security features, verifying that the internal source is approved for data transmissions, and verifying that the internal source is not Internet-facing.

7. The system of claim 1, wherein the data transmission tracking module is further configured to validate the external target, wherein validating the external target includes at least one of verifying that an Internet Protocol (IP) address associated with the external target is approved for receiving data transmissions, verifying that a recipient or application associated with the IP address is approved for receiving data transmissions and verifying that the recipient or application is an approved recipient or application based on the data-type.

8. The system of claim 1, wherein the data transmission logs indicate external data transmissions including at least one of previously completed external data transmissions and currently ongoing external data transmissions.

9. The system of claim 8, wherein the data transmission tracking module is further configured to, in response to determining that the external data transmission is not (a) a registered data transmission or (b) a valid registered data transmission, suspend transmission of a currently ongoing data transmission until the data transmission is validated.

10. The system of claim 8, wherein the data transmission tracking module is further configured to, in response to determining that the external data transmission is not valid, cancel transmission of a currently ongoing data transmission and generate and communicate an alert that notifies one or more designated entities within the enterprise of invalid data transmission and the cancellation of the transmission.

11. The system of claim 1, further comprising a data transmission permission module stored in the memory, executable by at least one processor and configured to verify that a data transmission is a registered data transmission prior to permitting the transmission of data.

12. The system of claim 11, wherein the data transmission tracking module is further configured to verify that the data transmission has been permitted for data transmission by the data transmission permission module.

13. A method for tracking external data transmissions in an enterprise, the method comprising:
   accessing, by a computing device processor, a data transmission inventory to retrieve at least one of one or more data transmission logs or one or more data transmission schedules stored in the inventory, wherein the data transmission logs and data transmission schedules identify a plurality of external data transmission and include, for each data transmission, identification of data, an internal source and an external data transmission;
   determining, by a computing device processors, for each of the external data transmissions in the one or data transmissions logs or the data transmission schedules, whether the external data transmission is a registered data transmission;
   determining, by a computing device processor, for each registered data transmission, whether the registered data transmission is a valid registered data transmission;
   in response to determining that the external data transmission is not (a) a registered data transmission or (b) a valid registered data transmission, validating, by a computing device processor, (i) data in the transmission, (ii) an internal source from which said data is transmitted, and (iii) an external target to which said data is transmitted; and
   in response to validating the (i) data in the data transmission, (ii) internal source, and (iii) external target, generating, by a computing device processor, a corresponding data transmission registration including an associated registration identifier and storing said data transmission registration in a data transmission registrar, wherein the data transmission registrar stores a plurality of data transmission registrations, wherein each registration includes an associated registration identifier and indicates validation of (i) data to be transmitted, (ii) an internal source from which said data is sent, and (iii) an external target to which said data is sent, wherein validation is defined by meeting predetermined external data transmission requirements.

14. The method of claim 13, further comprising, in response to failing to validate at least one of (i) the data in the transmission, (ii) the internal source, or (iii) the external target, tagging the data transmission to indicate at least one of invalid data, invalid source or invalid target.

15. The method of claim 14, further configured to generate and communicate an alert that notifies one or more designated entities within the enterprise of the failure to validate at least one of (i) the data in the transmission, (ii) the internal source, or (iii) the external target.

16. The method of claim 1, wherein the data transmission tracking module is further configured to, in response to determining that the data transmission is not a registered data transmission or a valid registered data transmission, generating and initiating communication of, by a computing device processor, an alert that notifies one or more designated entities within the enterprise that the data transmission is not registered or is not validly registered.

17. The method of claim 1, wherein validating the (i) data in the data transmission, (ii) internal source, and (iii) external target further comprises validating, by the computing device processor, (i) the data by at least one of verifying that the data has not been previously sent to the target, verifying that the data has not been previously received from the source, verifying that the data does not exceed a predetermined data size threshold and verifying that the data meets predetermined classification rules, (ii) the internal source by at least one of verifying that the internal source has current and required security features, verifying that the internal source is approved for data transmissions, and verifying that the internal source is not Internet-facing, and (iii) the external target by verifying that an Internet Protocol (IP) address associated with the external target is approved for receiving data transmissions, verifying that a recipient or application associated with the IP address is approved for receiving data transmissions and verifying that the recipient or application is an approved recipient or application based on the data-type.

18. An apparatus for tracking external data transmissions, the apparatus comprising:
   a computing platform including a memory and at least one processor in communication with the memory; and
   a data transmission tracking module stored in the memory, executable by the processor and configured to:
      access a data transmission inventory to retrieve at least one of one or more data transmission logs or one or more data transmission schedules stored in the inventory, wherein the data transmission logs and data transmission schedules identify a plurality of external data transmission and include, for each data transmission, identification of data, an internal source and an external data transmission,
      determine, for each of the external data transmissions in the one or data transmissions logs or data transmission schedules, whether the external data transmission is a registered data transmission,
      determine, for each registered data transmission, whether the registered data transmission is a valid registered data transmission,
      in response to determining that the external data transmission is not (a) a registered data transmission or (b) a valid registered data transmission, validate (i) data in the transmission, (ii) an internal source from which said data is transmitted, and (iii) an external target to which said data is transmitted, and
      in response to validating the (i) data in the data transmission, (ii) internal source, and (iii) external target, generate a corresponding data transmission registration including an associated registration identifier and store said data transmission registration in a data transmission registrar, wherein the data transmission registrar stores a plurality of data transmission registrations, wherein each registration includes an associated registration identifier and indicates validation of (i) data to be transmitted, (ii) an internal source from which said data is sent, and (iii) an external target to which said data is sent, wherein validation is defined by meeting predetermined external data transmission requirements.

19. The apparatus of claim 18, wherein the data transmission tracking module is further configured to, in response to failing to validate at least one of (i) the data in the transmission, (ii) the internal source, or (iii) the external target, tag the data transmission to indicate at least one of invalid data, invalid source or invalid target.

20. The apparatus of claim 19, wherein the data transmission tracking module is further configured to generate and communicate an alert that notifies one or more designated entities within the enterprise of the failure to validate at least one of (i) the data in the transmission, (ii) the internal source, or (iii) the external target.

* * * * *